US006144572A

United States Patent [19]

Mäkinen et al.

[11] Patent Number: 6,144,572

[45] Date of Patent: Nov. 7, 2000

[54] OUTPUT VOLTAGE REGULATION OF A POWER SUPPLY MODULE

[75] Inventors: Yrjö Mäkinen, Tuusula; Gösta Baarman, Siuntio kk; Mikael Björkas, Masala, all of Finland

[73] Assignee: Nokia Telecommunications OY, Espoo, Finland

[21] Appl. No.: 09/341,735

[22] PCT Filed: Jun. 2, 1998

[86] PCT No.: PCT/FI98/00112

§ 371 Date: Jul. 15, 1999

§ 102(e) Date: Jul. 15, 1999

[87] PCT Pub. No.: WO98/37620

PCT Pub. Date: Aug. 27, 1998

[30] Foreign Application Priority Data

Feb. 7, 1997 [FI] Finland ........ 970536

[51] Int. Cl.[7] ........ H02M 1/00

[52] U.S. Cl. ........ 363/147

[58] Field of Search ........ 363/144, 147; 361/397, 399, 400, 404

[56] References Cited

U.S. PATENT DOCUMENTS 4,638,178 1/1987 Kayser .
5,053,920 10/1991 Staffiere et al. .
5,604,674 2/1997 Terasawa ........ 363/147
5,757,201 5/1998 Partridge et al. ........ 324/55
5,933,343 8/1999 Lu et al. ........ 363/144

FOREIGN PATENT DOCUMENTS 0 374 293 6/1990 European Pat. Off. .
0 673 107 9/1995 European Pat. Off. .
WO 96/33543 10/1996 WIPO .

OTHER PUBLICATIONS

Copy of the Search Report for PCT/FI98/00112.

*Primary Examiner*—Matthew Nguyen
*Attorney, Agent, or Firm*—Altera Law Group, LLC

[57] ABSTRACT

The present invention relates to a printed circuit board arrangement comprising a printed circuit board and a power supply module to be attached to the printed circuit board for supplying operating voltage to the printed circuit board. To allow a proper operating voltage to be generated for the printed circuit board with no need for manual adjustment, the power supply module comprises a control connector and regulator means responsive to the control connector for regulating the output voltage of the power supply module. The printed circuit board also comprises means for connecting at least one out-connector of the power supply module to the control connector through a predetermined component, whereby the output voltage of the power supply module is responsive to the electric properties of said component.

8 Claims, 1 Drawing Sheet

OUTPUT VOLTAGE REGULATION OF A POWER SUPPLY MODULE

Figure 1:
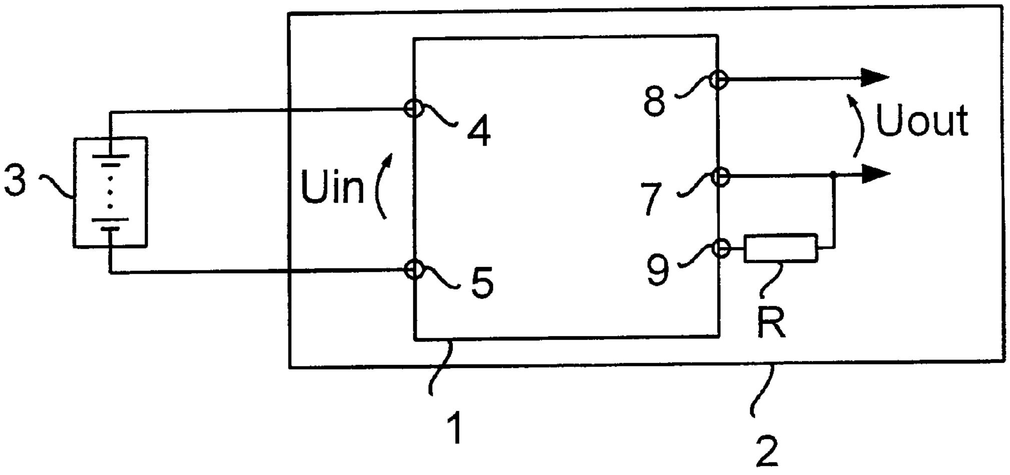

The present invention relates to a printed circuit board arrangement comprising a printed circuit board and a power supply module to be attached to the printed circuit board, said power supply module comprising in5 connectors for receiving primary voltage and out-connectors for supplying the printed circuit board with output voltage generated from primary voltage. The invention further relates to a power supply module comprising connectors for attaching the power supply module to a printed circuit board or the like, said connectors including at least in-connectors for receiving primary voltage and out-connectors for supplying the printed circuit board with output voltage generated from primary voltage.

The invention primarily relates to producing operating voltage for printed circuit boards of telecommunications devices, but the invention can also be applied in other connections.

Besides other components, previously known solutions usually comprise components arranged on the printed circuit board for ensuring a suitable operating voltage for the printed circuit board. The component needed to produce the operating voltage for each printed circuit board is, of course, determined by the operating voltage required by the printed circuit board. In practice this means that when a printed circuit board is designed, a power supply module ensuring a proper level of operating voltage for the printed circuit board has also to be designed separately. As a result, it takes longer to design a printed circuit board, which means a higher cost level of the printed circuit board.

Moreover, previously known solutions comprise power supply components on the printed circuit board including a component, a potentiometer for instance, by means of which the output voltage of the power supply can be manually adjusted. The drawback in this previously known solution is, however, that it requires manual adjustment before the printed circuit board can be put to use.

The object of the present invention is to solve the above problem and to provide a solution by which recurrent design of almost identical power supplies can be avoided, and by which it is possible to ensure that a given power supply module attached to a printed circuit board produces a proper operating voltage for the printed circuit board from the outset, with no need for manual adjustment. This object is achieved with the printed circuit board arrangement of the invention which is characterized in that the power supply module comprises a control connector and regulator means responsive to the control connector for regulating the output voltage of the power supply module, and the printed circuit board comprises means for connecting at least one out-connector of the power supply module to the control connector through a predetermined component, whereby the output voltage of the power supply module is responsive to the electric properties of said component.

The invention is based on the idea that when the power supply module is provided with regulator means for regulating its output voltage in response to a control signal received from the printed circuit board, the power supply module is able to independently regulate its output voltage to the level required by the printed circuit board in question. Thus it is possible to provide a general-purpose power supply module which can be utilized on printed circuit boards requiring different operating voltages with no need for recurrent power supply module design or manual adjustment. Moreover, by arranging a component on the printed circuit board to allow at least one out-connector of the power supply module to be connected to its control input, a solution is achieved by which the output voltage of the power supply module depends on the electric properties of the component on the printed circuit board. In other words, by arranging components having electrically different values on printed circuit boards which require different operating voltages it is possible to utilize identical power supply modules on said printed circuit boards.

Thus the most essential advantages of the solution of the present invention are that the same power supply module can be used by printed circuit boards operating at several different operating voltages, that to design a printed circuit board takes less time since designing its power supply module becomes unnecessary, and that the output voltage does not have to be separately regulated, since the output voltage of the power supply module is automatically regulated to correspond to the electric properties of the component arranged on the printed circuit board.

The invention further relates to a power supply module which can be utilized in the printed circuit board arrangement of the invention. The power supply module of the invention is characterized in that the power supply module comprises a control connector for receiving a control signal from the printed circuit board, and regulator means responsive to the control connector for regulating the output voltage of the power supply module in response to the control signal received through the control connector.

The preferred embodiments of the printed circuit board arrangement and the power supply module of the invention are shown in the attached dependent claims 2 to 3 and 5 to 6.

Figure 2:
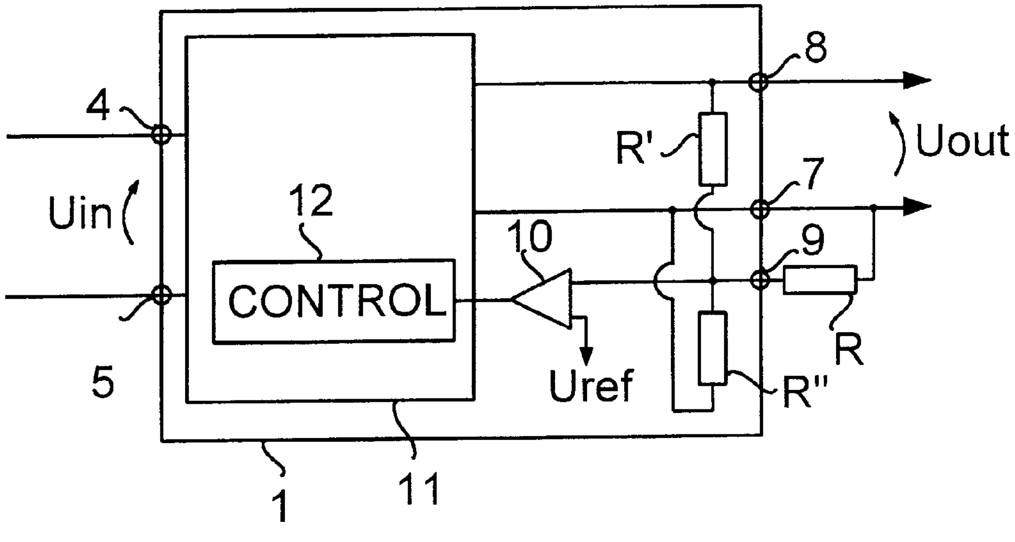

The invention will be described in closer detail in the following by way of example using a preferred embodiment of the invention with reference to the attached figures, in which FIG. 1 is a block diagram of a first preferred embodiment of the printed circuit board arrangement of the invention, and FIG. 2 illustrates a first preferred embodiment of the power supply module of the invention.

FIG. 1 is a block diagram of a first preferred embodiment of the printed circuit board arrangement of the invention. FIG. 1 shows a printed circuit board 2 and a power supply module 1 which might be removably attached to the printed circuit board by its connectors 4, 5 and 7 to 9.

In the case shown in FIG. 1 the power supply module obtains its primary voltage Uin from a battery 3 through the printed circuit board 2 through the in-connectors 4 and 5. The primary voltage can be 24V or 48V, for instance. The power supply module similarly supplies operating voltage Uout to the printed circuit board 2 through the out-connectors 7 and 8.

In accordance with the invention, the printed circuit board is provided with a component R which can be a resistor and through which the out-connector 7 of the power supply module 1 is connected to the control connector 9 of the power supply module, is arranged on the printed circuit board. In the case shown in FIG. 1 the electric properties of the resistor R, in other words the resistance, determine the operating voltage Uout of the power supply module 1, said voltage ranging from 5V to 12V, for instance, depending on the resistance of the resistor R. Thus the power supply module 1 requires no manual regulation to ensure the proper output voltage; it is sufficient to mount the power supply module 1 in place on the printed circuit board 2, whereby the regulator means of the printed circuit board can choose the proper output voltage Uout according to the properties of the resistor R.

FIG. 2 illustrates a first preferred embodiment of the power supply module of the invention. The power supply module in FIG. 2 corresponds to the power supply module shown in FIG. 1.

The power supply module in FIG. 2 comprises a switched-mode power supply 11 which produces output voltage Uout from primary voltage Uin supplied to it through the connectors 4 and 5, the value of said output voltage being dependent on the control circuit 12 of the switched-mode power supply. The switched-mode power supply 11 in FIG. 2 utilizes pulse width modulation and is known per se. It utilizes pulse width modulation, in other words regulates the relation between the lengths of the ON period and OFF period of the transistor switches in the switched-mode power supply in the manner controlled by control circuit 12, and thus retains the desired output voltage level.

The control circuit 12 of the switched-mode power supply 11 is, in turn, responsive to a differential amplifier 10, to whose one input a reference voltage Uref is supplied and to whose other input a voltage obtained through the resistors R, R' and R" is supplied. The differential amplifier 10 thus controls the switched-mode power supply 11 in such a manner that the proper level of the output voltage Uout of the power supply module is achieved. As distinct from the case shown in FIG. 2, an optocoupler can be arranged between the differential amplifier 10 and the control circuit 12, if necessary.

It will be understood that the above description and the related figures are only intended to illustrate the present invention. Many modifications and variations of the invention will be apparent to those skilled in the art without departing from the scope and spirit of the invention disclosed in the attached claims.

What is claimed is:

1. A printed circuit board arrangement comprising a printed circuit board and a power supply module to be attached to the printed circuit board, said power supply module comprising in-connectors for receiving primary voltage and out-connectors for supplying the printed circuit board with output voltage wherein generated from primary voltage, wherein the power supply module comprises a control connector and regulator means responsive to the control connector for independently regulating the output voltage of the power supply module, and the printed circuit board comprises means for connecting at least one out-connector of the power supply module to the control connector through a predetermined component, whereby the output voltage of the power supply module is responsive to the electric properties of said component.

2. A printed circuit board arrangement as claimed in claim 1, wherein the power supply module comprises means for receiving the primary voltage from the printed circuit board.

3. A printed circuit board arrangement as claimed in claim 1 wherein said component is a resistor, whereby the output voltage of the power supply module is responsive to the resistance of the resistor.

4. A power supply module comprising connectors for attaching the power supply module to a printed circuit board or the like, said connectors for supplying output voltage generated from primary voltage to said printed circuit board, wherein the power supply module comprises a control connector for receiving a control signal from the printed circuit board, and regulator means responsive to the control connector for independently regulating the output voltage of the power supply module in response to the control signal received through the control connector.

5. A power supply module as claimed in claim 4, wherein the power supply module comprises means for receiving primary voltage from the printed circuit board.

6. A power supply module as claimed in claim 4 wherein the power supply module comprises a switched-mode power supply utilizing pulse width modulation, and comparator means responsive to the control connector for comparing the control signal to a predetermined reference voltage, and that the output of the comparator means is connected to the control circuit of the switched-mode power supply for regulating the output voltage of the power supply module in response to the result of the comparison.

7. A printed circuit board arrangement as claimed in claim 2, wherein said component is a resistor, whereby the output voltage of the power supply module is responsive to the resistance of the resistor.

8. A power supply module as claimed in claim 5, wherein the power supply module comprises a switched-mode power supply utilizing pulse width modulation, and comparator means responsive to the control connector for comparing the control signal to a predetermined reference voltage, and that the output of the comparator means is connected to the control circuit of the switched-mode power supply for regulating the output voltage of the power supply module in response to the result of the comparison.

* * * * *

UNITED STATES PATENT AND TRADEMARK OFFICE
CERTIFICATE OF CORRECTION

PATENT NO. : 6,144,572
DATED : November 7, 2000
INVENTOR(S) : Makinen et al.

It is certified that error appears in the above-identified patent and that said Letters Patent is hereby corrected as shown below:

Title page,
Item [22], please replace "2 June, 1998" with -- 06 February 1998 --.

Signed and Sealed this

Twelfth Day of March, 2002

Attest:

JAMES E. ROGAN

*Attesting Officer* *Director of the United States Patent and Trademark Office*